H. S. BALL.
Compound Stationery Implements.

No. 133,350. Patented Nov. 26, 1872.

UNITED STATES PATENT OFFICE.

HUGH S. BALL, OF SPARTANBURG, SOUTH CAROLINA.

IMPROVEMENT IN COMPOUND STATIONERY IMPLEMENTS.

Specification forming part of Letters Patent No. 133,350, dated November 26, 1872.

*To all whom it may concern:*

Figure 1:
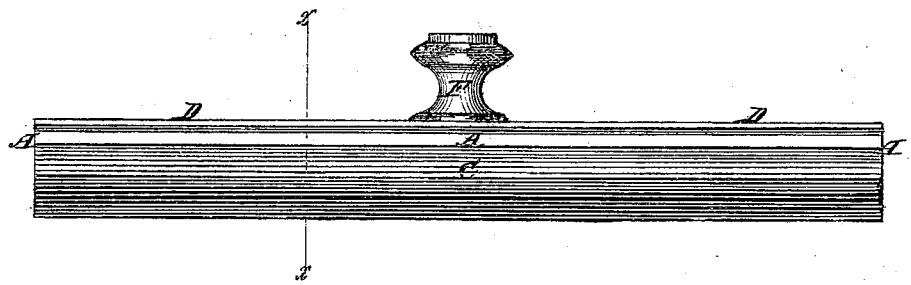
Figure 2:
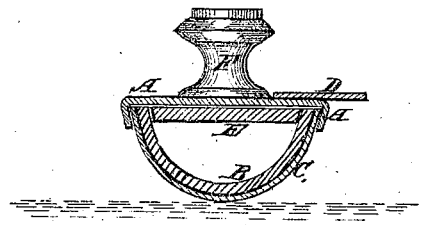

Be it known that I, HUGH S. BALL, of Spartanburg, in the county of Spartanburg and State of South Carolina, have invented an Improved Combined Ruler, Blotter, and Paper-Cutter, of which the following is a specification:

Figure 1 is a side view of my improved ruler, blotter, and paper-cutter. Fig. 2 is a detail cross-section of the same taken through the line $x$ $x$, Fig. 1.

Similar letters of reference indicate corresponding parts.

My invention has for its object to furnish an improved ruler, blotter, and paper-cutter combined, which shall be so constructed that it may be used with as much facility as a ruler, blotter, and paper-cutter as if it were constructed especially for each of said uses; and it consists in the construction and combination of the various parts of the device, as hereinafter more fully described.

A is a plate of light sheet metal, of suitable length and breadth, the side edges of which are bent downward a little beyond a right angle, as shown in Fig. 2. B is a plate of sheet rubber of the same length as the plate A, and of such a breadth that when its side edges are sprung or slipped between the flanges or turned-down edges of the plate A the said rubber plate may have the form of a semi-cylinder, as shown in Fig. 2. C is a sheet of blotting-paper of the same length and breadth as the rubber-plate B, and which is placed upon the outer or convex surface of the rubber plate B, and between the flanges or turned-down edges of the plate A. D is a narrow strip of sheet metal soldered or otherwise attached to the side part of the plate A, as shown in Figs. 1 and 2, so as to project so much that by pressing the device down toward that side the edge of the plate D may be brought in contact with the paper to enable it to be torn straight. E is a strip of wood, the edges of which are beveled off, as shown in Fig. 2, to correspond with the inclination of the turned-down edges or flanges of the plate A, so as when pushed in between the edges of the rubber plate B it may press the edges of the rubber plate B and blotting-paper C against the turned-down edges or flanges of the plate A, and may thus securely confine the said rubber plate and blotting-paper in place. With this construction, when the blotting-paper C becomes soiled, the rubber plate B, blotting-paper C, and wooden strip E may be conveniently slipped out and the blotting-paper C replaced by a new one. The device may have a knob or other handle, F, attached to it for convenience in using it.

Having thus described my invention, I claim as new and desire to secure by Letters Patent—

As a new article of manufacture, the compound implement herein described, consisting of plate A having side edges turned down, the rubber-plate B, blotting-paper C, the projecting strip D, the wooden strip E, and the handle F, arranged to form a ruler, blotter, and paper-cutter, as set forth.

HUGH S. BALL.

Witnesses:
R. E. CLEVELAND,
JNO. H. EVINS.